(No Model.)

G. W. TOOKER.
INVALID'S BED PAN.

No. 381,972. Patented May 1, 1888.

WITNESSES:
Walter T. Bilyeu
Frank Groves

INVENTOR.
George W. Tooker
BY
G. H. Harding
ATTORNEY.

UNITED STATES PATENT OFFICE.

GEORGE W. TOOKER, OF NEW YORK, N. Y.

INVALID'S BED-PAN.

SPECIFICATION forming part of Letters Patent No. 381,972, dated May 1, 1888.

Application filed May 11, 1887. Serial No. 237,798. (No model.)

*To all whom it may concern:*

Be it known that I, GEORGE W. TOOKER, a citizen of the United States, residing in the city, county, and State of New York, have invented certain new and useful Improvements in Invalids' Bed-Pans, of which the following is a specification.

My invention relates to invalids' bed-pans; and it consists in forming a bed-pan of any suitable material, preferably of earthenware, having a bowl with a wedge-shaped tapering bottom of nearly uniform thickness.

By means of the principles used in my form of bed-pan, the objectionable features found in the old forms of bed-pans are overcome.

A bed-pan made upon my model will, owing to the tapering wedge or keel shaped formation of the bowl or bottom, sink into a mattress very readily, and admit of easier and less painful insertion beneath the patient. When in position beneath the patient, the top of the pan will be nearly on a level with the top of mattress, allowing greater freedom in movement of patient's limbs, and will also, by force of gravity, cause all liquids or other matter deposited in the pan to descend to the forward part of the bowl, insuring less danger of soiling the bedding.

The keel or wedge shaped bowl, to be adapted to sink into all kinds of mattresses, may be either formed of straight lines or one or more curves.

The old forms of bed-pans, owing to their peculiar formation, are not adapted to sink into a mattress, are painful to the patient as well as uncertain of adjustment, and are difficult to empty and cleanse thoroughly.

Figure 2:
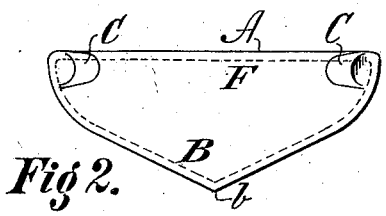
Figure 1:
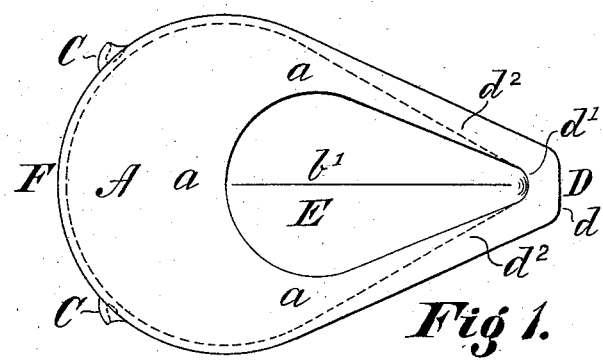
Figure 3:
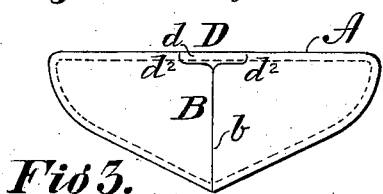
Figure 6:
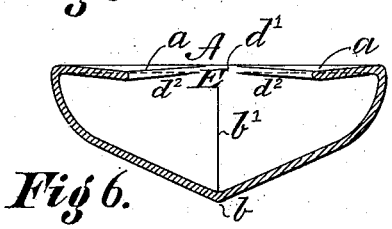
Figure 4:
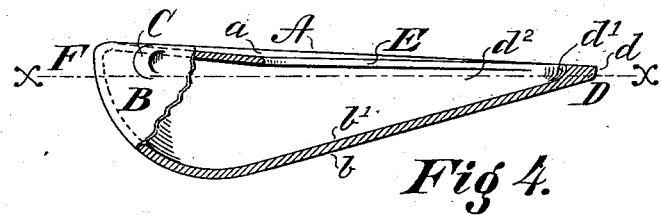
Figure 5:
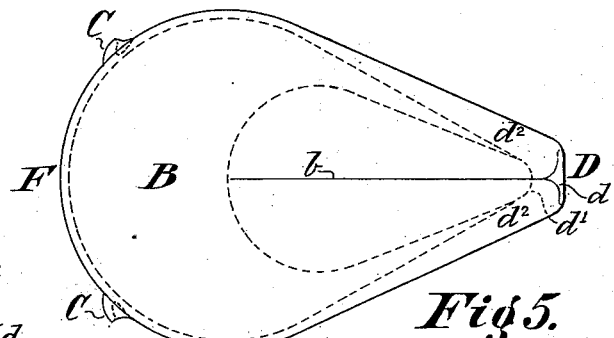
Figure 10:
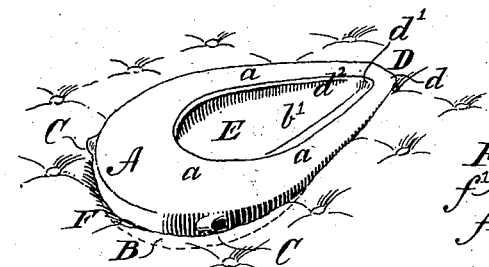
Figures 7, 8, 9:
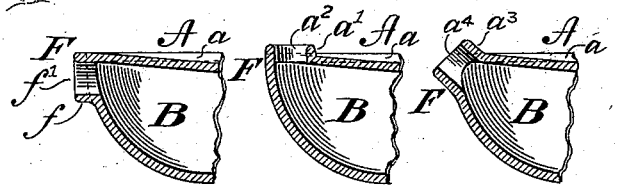

Referring to the accompanying drawings, which form part of this specification, and illustrate what I consider the best means of carrying out my invention, Figure 1 is a top plan view of my bed-pan. Fig. 2 is an elevation of the large end of my bed-pan. Fig. 3 is an elevation of the small end of my bed-pan. Fig. 4 is a longitudinal section taken through the vertical center of my bed-pan. Fig. 5 is a bottom plan of my bed-pan. Fig. 6 is a cross-section through the widest part of my bed-pan. Figs. 7, 8, and 9 are partial longitudinal sections of my bed-pan, showing different positions of stopper-holes for emptying and cleansing. Fig. 10 is a perspective view of my bed-pan, showing it in position on the mattress.

In each of the views similar letters of reference are employed to indicate corresponding parts wherever they occur.

A represents the top or seat; B, the bowl or bottom; C C, the ears or lugs for withdrawing the pan; D, the small or spout end of the pan; E, the seat opening or hole; F, the large or bowl end.

By pushing the end D under the patient to a sufficient distance to enable the patient to deposit into the bowl B through the opening E the keel $b$ is forced into the mattress and the pan caused to assume a position in relation to the mattress, as shown in Fig. 4, the broken line $x$ $x$ representing the top of the mattress.

The valley or spout $b'$ conveys anything deposited in the pan to the large end of the bowl B.

The solid formation $d$ at the end D produces an abrupt rise or dam, $d'$, at the end of the spout $b'$, so that any tendency to inadvertent overflow at that end is checked.

The shelf formation $a$ $a$ $a$ overcomes any tendency to overflow at the front and sides of the pan, while anything deposited on the shelf is by the inward slope carried into the bowl B through the opening E.

For emptying the pan at the end D the spout $b'$ is assisted by the gradually-tapering solid formation $d^2$ $d^2$ of the sides of the spout $b'$ of the bowl B, these forcing any liquids or other matter from beneath the shelf formation $a$ $a$ $a$.

For emptying the pan at the end F any one of the holes $b'$, $a^2$, or $a^4$, made by the solid shoulders $f$, $a'$, or $a^3$, as shown in Figs. 8, 9, and 10, respectively, may be used. The holes $f'$, $a^2$, and $a^4$ are intended to be closed by suitable stoppers when the pan is under the patient.

Having thus described my invention, what I claim, and desire to secure by Letters Patent, is—

A bed or invalid pan the sides of which converge toward each other and form an angular bottom adapted to sink within the mattress or bed.

In witness whereof I have hereunto set my hand this 7th day of May, 1887.

GEORGE W. TOOKER.

Witnesses:
JAMES HUNTER,
ISRAEL DEKEYSER.